United States Patent [19]

Okazaki et al.

[11] Patent Number: 5,038,725
[45] Date of Patent: Aug. 13, 1991

[54] INTAKE MANIFOLD OF INTERNAL COMBUSTION ENGINE

[75] Inventors: Gouki Okazaki, Chigasaki; Motohisa Funabashi, Sagamihara, both of Japan

[73] Assignee: Hitachi, Ltd., Tokyo, Japan

[21] Appl. No.: 442,638

[22] Filed: Nov. 29, 1989

[30] Foreign Application Priority Data

Dec. 2, 1988 [JP] Japan .................. 63-304093

[51] Int. Cl.$^5$ ............................................ F02M 35/10
[52] U.S. Cl. ............................................. 123/52 M
[58] Field of Search ......... 123/52 M, 52 MB, 52 MC, 123/549, 540, 541, 542

[56]  References Cited

U.S. PATENT DOCUMENTS

| | | | |
|---|---|---|---|
| 3,177,633 | 4/1965 | McDonald | 123/542 |
| 3,875,918 | 4/1975 | Loynd | 123/188 M |
| 3,892,211 | 7/1975 | Oyama | 123/540 |
| 3,892,215 | 7/1975 | Hickling et al. | 123/52 MV |
| 4,058,096 | 11/1977 | Brown | 123/542 |
| 4,165,720 | 8/1979 | Barcak | 123/540 |
| 4,169,436 | 10/1979 | Welch et al. | 123/540 |
| 4,242,999 | 1/1981 | Hoser | 123/549 |
| 4,325,344 | 4/1982 | Igashira et al. | 123/549 |
| 4,347,826 | 9/1982 | Nomura et al. | 123/549 |
| 4,356,804 | 11/1982 | Igashira et al. | 123/549 |
| 4,474,162 | 10/1984 | Mason | 123/542 |
| 4,497,287 | 2/1985 | Schleiermacher et al. | 123/52 MC |
| 4,589,381 | 5/1986 | Takayama | 123/52 M |
| 4,683,725 | 8/1987 | Sugiura | 123/542 |
| 4,716,878 | 1/1988 | Shimada et al. | 123/540 |
| 4,726,329 | 2/1988 | Atkin | 123/52 MV |
| 4,776,313 | 10/1988 | Freismuth et al. | 123/52 M |
| 4,915,064 | 4/1990 | Mannerstedt | 123/542 |

FOREIGN PATENT DOCUMENTS

| | | | |
|---|---|---|---|
| 0008418 | 1/1985 | Japan | 123/542 |
| 0271928 | 11/1987 | Japan | 123/542 |
| 0271932 | 11/1987 | Japan | 123/542 |
| 0094065 | 4/1988 | Japan | 123/542 |

*Primary Examiner*—David A. Okonsky
*Attorney, Agent, or Firm*—Antonelli, Terry, Stout & Kraus

[57] ABSTRACT

An intake manifold of an internal combustion engine is structured either to keep the temperature in the intake manifold constant or to allow the temperature in the intake manifold to be controlled from outside thereof for thereby increasing the engine output. For this purpose, following measures are employed:

(1) The intake manifold is made of a material having a low heat conductivity;
(2) The outer periphery of the intake manifold is covered with an adiabatic material;
(3) The intake manifold is of a double walled structure; and
(4) The intake manifold is provided with a cooler or a heater.

3 Claims, 3 Drawing Sheets

INTAKE MANIFOLD OF INTERNAL COMBUSTION ENGINE

BACKGROUND OF THE INVENTION

The present invention relates to an intake manifold of an internal combustion engine for use with, for example, an automobile, which manifold is suitable for lowering the temperature of air to be sucked into the engine.

Various methods have been employed in the past to increase the outputs of automotive internal combustion engines. The methods include supercharging which is to raise the pressure of intake air to positively increase the quantity of air fed into an internal combustion engine. Another method is to improve the shape of the engine intake manifold so that the inertia of intake air or the effect of pulsation of the intake air is utilized to increase the quantity of air fed into the engine. A still further method is termed an "intercooler method" by which, as disclosed in a Japanese Magazine, "Jidosha Kogaku (Automotive Engineering)", Vol. 35, No. 7, pages 106-108, the engine intake manifold is disposed adjacent to the front grille of the car to expose the intake manifold to outdoor air so as to remove heat from the intake air for thereby increasing the quantity of air fed into the engine.

While the prior art methods are all effective to increase the quantities of air to be supplied into internal combustion engines, the temperature of engine intake air has not been taken into consideration in the prior art. It will be appreciated that the intercooling method cannot lower the temperature of intake air below the outdoor air temperature. If the intake air temperature is high, the compression stroke in the engine cylinder commences at a correspondingly high temperature which tends to cause an abnormal combustion, with a disadvantageous result in that, even if the quantity of intake air is greatly increased, the compression ratio cannot be increased too much.

SUMMARY OF THE INVENTION

It is an object of the present invention to provide an engine intake manifold which is operative to lower the temperature of engine intake air.

It is another object of the present invention to provide an engine intake manifold which is responsive to an engine operation condition (for example, an engine operation in a cold district) to appropriately heat the engine intake air.

The first object of the invention can be achieved by employing the following measures individually or in combination:

(1) As the material of an engine intake manifold, to use a material having a heat conductivity which is lower than that of conventionally used cast iron and aluminium;

(2) To surround the intake manifold with an adiabatic material to minimize the transfer of heat into the intake manifold from outside thereof;

(3) To provide the intake manifold with a double walled structure and to fill the space between the outer and inner walls with a gas, liquid or solid material having a low heat conductivity; and (4) To cool the wall of the intake manifold by a cooler provided thereon.

The second object of the invention can be achieved by providing the following measures for the intake manifold for which the above measures are employed individually or in combination:

(5) To provide an intake manifold, into which a liquid fuel is injected, with a fuel sump at the portion of the intake manifold where the liquid fuel tends to adhere, and to provide a heater for vaporizing the liquid fuel in the sump;

(6) To provide a heater on the whole or a part of the wall of the intake manifold to heat the manifold wall and thus the interior thereof; and (7) In addition to the measure (4) or (5), to provide a sensor for detecting an engine operating condition so that the information from the sensor can be utilized to control the heating of the intake manifold.

The above and other objects, features and advantages of the present invention will be made more apparent by the following description of preferred embodiments of the invention made with reference to the accompanying drawings.

DESCRIPTION OF PREFERRED EMBODIMENTS

The principle of the present invention will be described first.

An intake manifold of an internal combustion engine is connected to a cylinder with the intermediary of an intake valve. Air introduced into the intake manifold through the inlet thereof will flow into the engine cylinder when the intake valve is opened. The air receives heat from the wall of the intake manifold during the passage of the air therethrough to the intake valve. The quantity Q of the heat can be represented by an equation $$Q = k(T_2 - T_1) F \qquad (1)$$

where $T_1$ represents the temperature of the intake air, $T_2$ the temperature of the wall of the intake manifold, k the constant of proportion (coefficient of heat conductivity) of the wall of the intake manifold and F the inner surface area of the wall.

Assume that an engine of a cylinder bore diameter of 92 mm and a compression ratio of 9.7 is running at 2400 r.p.m. with the throttle valve closed. The heat coming into and out of the intake manifold comprises heat conducted through the wall of the intake manifold and the heat of gases flowing between the intake manifold and the engine cylinder through the intake valve.

Even if the intake manifold wall temperature $T_2$ is 358° K. (85° C.), the intake air temperature $T_1$ is gradually lowered and approaches, mathematically, 2° K. if the intake manifold wall has a very small heat conductivity k and is almost adiabatic, with a result that the pressure in the intake manifold is lowered. On the other hand, if the heat conductivity k of the intake manifold wall is similar to that of the conventional intake manifold, the temperature of the intake air flowing through the intake manifold is gradually raised and approaches the intake manifold wall temperature $t_2$ due to the heat transferred through the intake manifold wall, with a result that the pressure in the intake manifold rises to a level higher than in the case where the heat conductivity k is very low.

Figure 1:
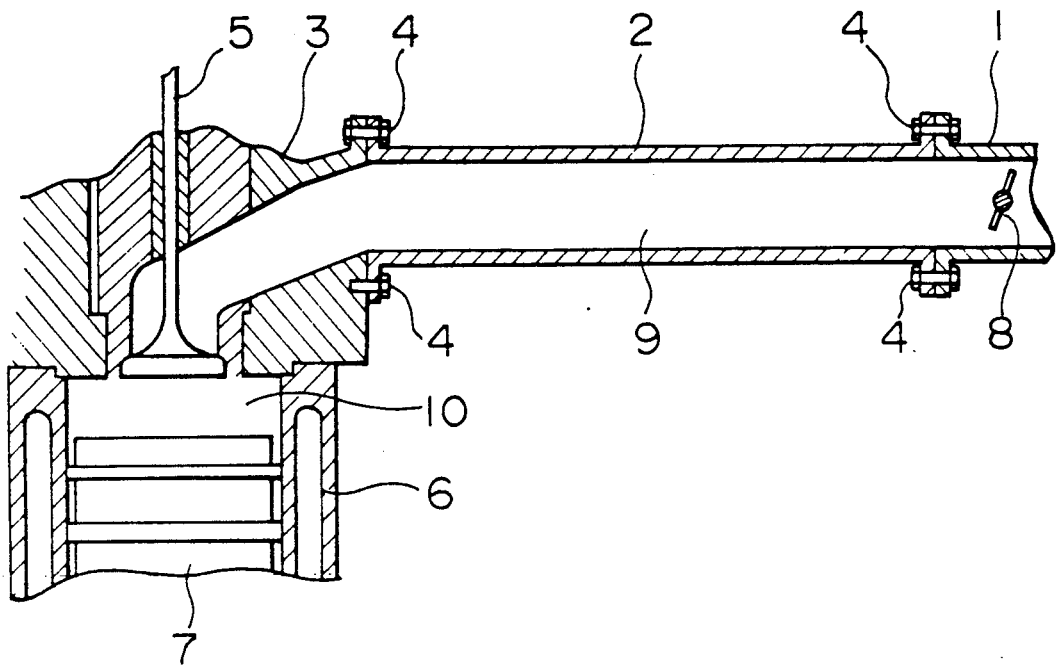
FIG. 1 is a fragmentary sectional view of an internal combustion engine equipped with an embodiment of an intake manifold according to the present invention.
Figure 2:
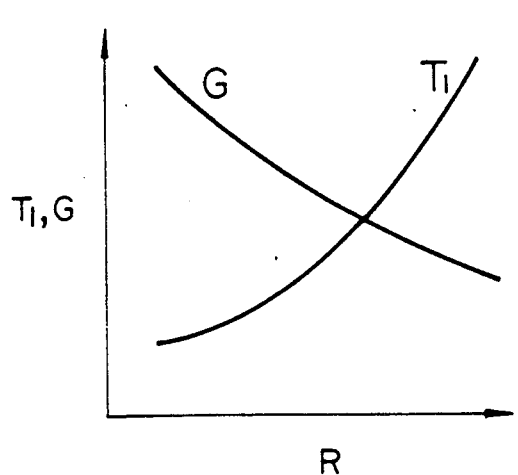
FIG. 2 is a graph showing the relationship between the heat conductivity k and the intake air temperature $T_1$ and the quantity G of the intake air.
Figure 3:
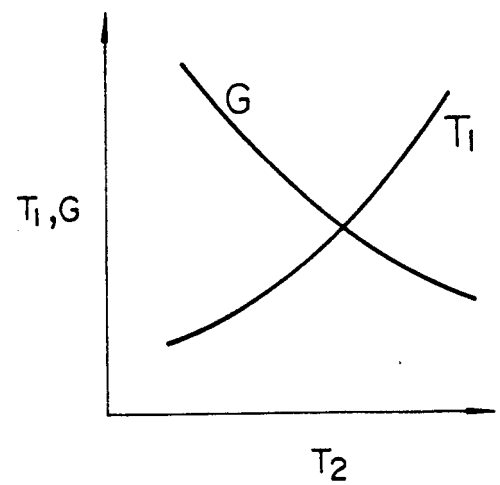
FIG. 3 is a graph showing the relationship between the temperature $T_2$ of the wall of the intake manifold and the intake air temperature $T_1$ and the quantity G thereof.

FIG. 2 shows the relationship between the intake air temperature $T_1$ and the quantity G of the intake air flowing from the intake manifold into an engine cylinder in one crank angle, the relationship being taken at a certain engine speed and a certain temperature of the intake manifold wall with the factor k of the equation (1) varied from a small value to a large value. It will be seen in FIG. 2 that the smaller k (a high ability of insulation) is, the smaller $T_1$ is and the greater G is. FIG. 3 shows how the $T_1$ and G are varied when the factor k and the engine speed are kept unchanged and the intake manifold wall temperature $T_2$ is varied. It will be seen in FIG. 3 that the lower $T_2$ is, the lower $T_1$ is and the greater G is.

It is understood from the described characteristics concerning the supply of heat to the intake air in the engine intake manifold that to increase the adiabatic ability of the intake manifold or to lower the temperature of the wall of the intake manifold by providing a cooler on the wall is effective to lower the temperature of intake air.

On the other hand, to lower the intake air temperature adversely affects the vaporization of the liquid fuel injected into the intake manifold and adhering to the inner surface thereof. The part of the intake manifold to which the injected liquid fuel adheres can be approximately determined based on the configuration of the intake manifold and the specification of the engine. Thus, a fuel sump with a heater disposed on the outer surface thereof may be provided at an appropriate point adjacent to such part of the intake manifold so that the liquid fuel adhering to the part of the intake manifold is accumulated in the fuel sump and heat is fed through the outer wall of the sump to the accumulated fuel to facilitate vaporization thereof.

There are cases, such as engine start-up, in which a high intake air temperature and a high temperature of an air-fuel mixture at the commencement of a compression stroke in an engine cylinder are preferred. Thus, the heater provided on the outer surface of the intake manifold may preferably be operated at such a time to supply heat through the wall of the intake manifold to provide an optimum temperature of the intake air.

Now, embodiments of the present invention will be described with reference to FIGS. 1 and 4-6.

A first intake manifold section 1 with a throttle valve 8 disposed therein, a second intake manifold section 2 and a cylinder head 3 having an air inlet opening are connected together by clamping means 4 to cooperate together to define an air induction passage 9. The cylinder head 3 is mounted on a cylinder block 6 and cooperates with a piston 7 to define a combustion chamber 10. The air induction passage 9 communicates with the combustion chamber 10 with an intermediary of an intake valve 5.

In the past, engine components, such as the intake manifold and the cylinder head, were made of a material having a high heat conductivity, such as aluminum or cast iron. In a first embodiment of the present invention shown in FIG. 1, however, a material having a low heat conductivity, such as a plastic material, is used to form the second intake manifold section 2 which is not required to have a high mechanical strength.

Accordingly, the second intake, manifold section 2 can be prevented from experiencing a temperature rise due to heat transfer from the cylinder head 3 at a high temperature and from a high temperature air surrounding the engine. In addition, the low heat conductivity of the second intake manifold section 2 minimizes the transfer of heat therethrough to the intake air flowing through the air induction passage 9 during an intake stroke of the engine to thereby not only prevent a temperature rise of the engine intake air but also lower the temperature of the air.

Figure 4:
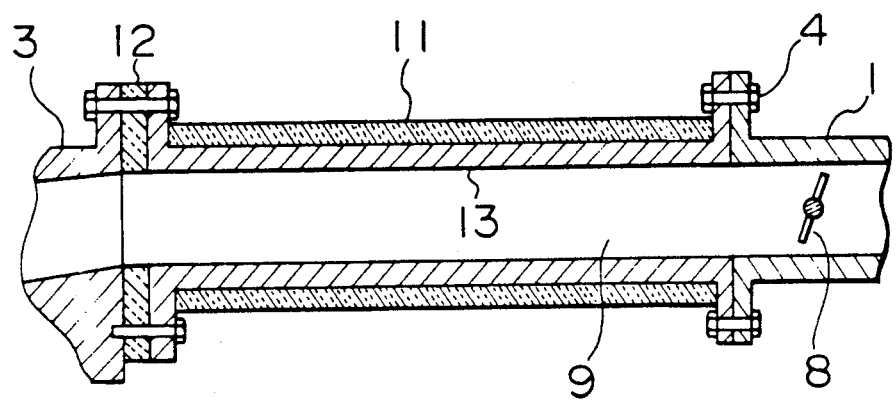
FIGS. 4 and 5 are fragmentary sectional views of other embodiments of the intake manifold according to the present invention.

FIG. 4 shows a second embodiment of the invention in which the second intake manifold section 2 of the first embodiment is replaced by a different second intake manifold section 13 which may be made of a material the same as that of the first intake manifold section 1 or the cylinder head 3. In order to minimize the transfer of heat from outside the intake manifold to the intake air flowing through the air induction passage 9, the second intake manifold section 13 is surrounded by or coated with an adiabatic material 11. In addition, so as to prevent the heat of the cylinder head 3 from transferring to the second intake manifold section 13 and raise the temperature of the wall thereof, the cylinder head 3 and the second intake manifold section 13 are connected together with a packing 12 of a low heat conductivity interposed therebetween. The described structure of the second embodiment provides an advantage similar to that obtainable from the first embodiment.

Figure 5:
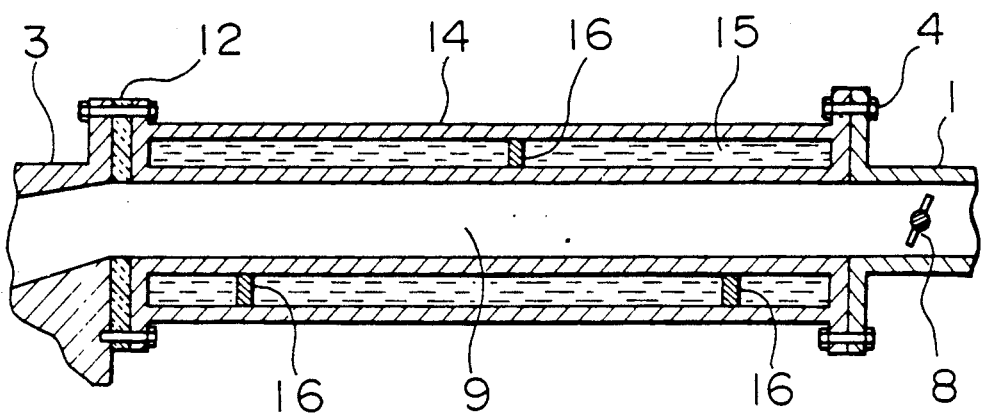

FIG. 5 shows a third embodiment of the invention in which the second intake manifold section 2 is replaced by a still different second intake manifold section 14 having outer and inner walls 14a and 14b separated by spacers 16. A coolant 15 is caused to flow through the space between the outer and inner walls 14a and 14b to lower the temperature of the inner wall 14b disposed in contact with the intake air flowing through the air induction passage 9 and remove the heat transferred through the outer wall 14b from outside the intake manifold for thereby preventing the engine intake air from being heated.

Figure 6:
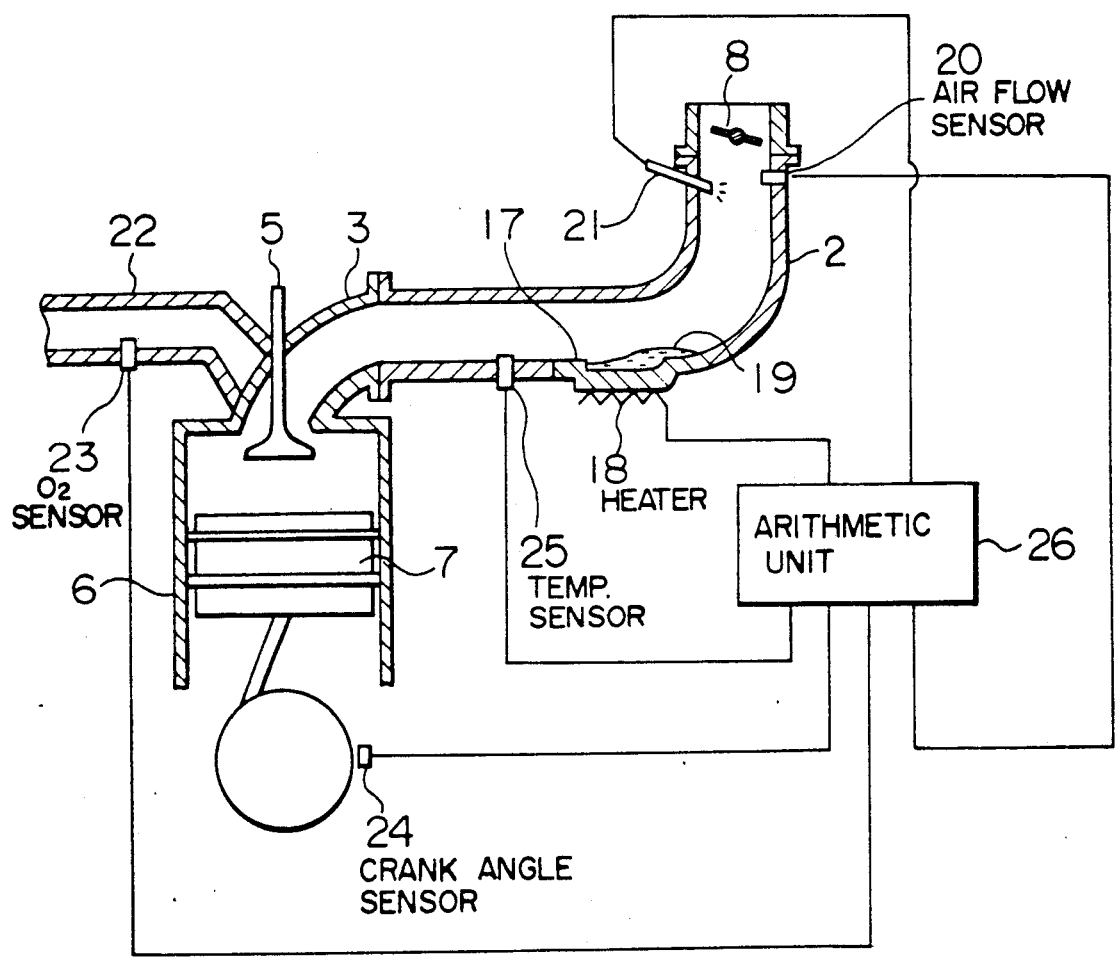
FIG. 6 is a block diagram of a control system of an internal combustion engine having an intake manifold provided with a fuel sump and a heater.

FIG. 6 shows a fourth embodiment of the invention in which the second intake manifold section 2 is curved and provided with a fuel sump 17 formed in a part of the inner surface thereof. In addition, a heater 18 is provided on the outer surface of that part of the second intake manifold section 2 in which the fuel sump 17 is formed. A liquid fuel injected by an injector 21 into the intake manifold tends to form a film 19 of the liquid fuel on a portion of the inner surface of the second intake manifold section 2. This portion is determined by factors such as the configuration of the second intake manifold section 2. The fuel sump 17 is disposed at this portion of the second intake manifold 2. There are two alternative ways in which the heater 18 is operated. In one of the heater operations, a constant electric current is fed to the heater 18 to facilitate vaporization of the liquid fuel film 19. In the other heater operation, an information from sensors shown in FIG. 6 can be utilized to control the supply of the electric current to the heater 18 such that the rate of vaporization of the liquid fuel film 19 is accorded with the engine operation condition.

An air flow sensor 20 detects the amount G of intake air which has passed through the throttle valve 8. A temperature sensor 25 provides information concerning the temperature of the intake air. A crank angle sensor 24 provides information concerning the engine speed N and the crank angle $\theta$. An $O_2$ sensor 23 provided on an exhaust manifold 22 of the engine detects the engine exhaust gases to provide an information concerning an air/fuel ratio at the time of the combustion. All of the information is input into an arithmetic unit 26 which is operative to determine the quantity B of fuel required to provide a predetermined engine output and emit a predetermined instruction signal to the injector 21. In the determination of the fuel quantity B, an amount $B_1$ of the fuel vaporized from the liquid fuel film 19 is presumed to correct the quantity of fuel to be injected. The presumption of the vaporized amount of fuel $B_1$ is based on the supply of electric current I which is determined based on the intake air temperature T and a presumed amount $Bo$ of the liquid fuel film. The presumed amount $Bo$ is an integrated value obtained from the fuel quantity B up to the present moment, the vaporized fuel amount $B_1$ and so forth. Thus, the quantity B of the fuel to be injected is as follows:

$B_1 = f_1 (Bo, T, I)$ $B = f_2 (G, N, A/F, B_1, Bo)$ $Bo = f_3 (B, Bo, B_1)$

As will be seen from the above description, the present invention provides the following advantages:

(1) The temperature of the intake air can easily be lowered to effectively increase the quantity of intake air flowing from the intake manifold into an engine cylinder;

(2) The temperature at which compression is commenced can be lowered to suppress the occurrence of engine knock;

(3) The provision of the fuel sump and the heater at an appropriately selected portion of the intake manifold can eliminate an adverse affect on the vaporization of fuel which would otherwise be caused due to the decrease in the intake air temperature; and (4) Operations of the heater at selected times can moderate the reduction in the temperature of the intake air.

As examples of the reduction in the intake air temperature and the increase in the quantity of engine intake air, following data has been obtained: of 92 mm and a compression ratio of 9.5 was operated at 800 r.p.m. with the temperature of the wall of the intake manifold kept at 330° K. at one time and at 303° K. at another time. It was observed that the intake air temperature and the quantity of the engine intake air both obtained at the intake manifold wall temperature of 303° K. were respectively lower by 26° K. and greater by 5% than those obtained at the intake manifold wall temperature of 330° K.

What is claimed is:

1. An engine intake manifold of an internal combustion engine, comprising a first intake manifold section having an air inlet through which ambient air can be sucked into the intake manifold and an air outlet through which the thus sucked ambient air can flow towards an engine cylinder, a second intake manifold section having a structure which is effective to reduce the influence of the temperature of the air outside the intake manifold on the temperature of the air flowing within the intake manifold, first clamping mean connecting one end of said second intake manifold section to said air outlet of said first intake manifold section, and a second clamping means connecting the other end of said second intake manifold section to a cylinder head of the engine, wherein said second intake manifold section is made of a first material and has an outer surface covered with an adiabatic second material.

2. An engine intake manifold of an internal combustion engine, comprising a first intake manifold section having an air inlet through which ambient air can be sucked into the intake manifold and an air outlet through which the thus sucked ambient air can flow towards an engine cylinder, a second intake manifold section of a structure which allows the temperature therein to be controlled from outside thereof, first clamping means connecting one end of said second intake manifold section to said air outlet of said first intake manifold section, and second clamping means connecting the other end of said second intake manifold section to a cylinder head of the engine, wherein said second intake manifold section is provided with a fuel sump and means for heating said fuel sump from outside of said second intake manifold section so as to provide localized heating of said fuel sump through the wall thereof.

3. An engine intake manifold according to claim 2, further including sensor means for detecting an operating condition of the engine and a controller operative to control said temperature controlling means based on information from said sensor means.

* * * * *